US009008935B2

(12) United States Patent
Konishi

(10) Patent No.: US 9,008,935 B2
(45) Date of Patent: Apr. 14, 2015

(54) SPEED CONTROL DEVICE AND PROGRAM FOR SPEED CONTROL DEVICE

(71) Applicant: HORIBA, Ltd., Kyoto-shi, Kyoto (JP)

(72) Inventor: Takao Konishi, Kyoto (JP)

(73) Assignee: HORIBA, Ltd., Kyoto-shi (JP)

( * ) Notice: Subject to any disclaimer, the term of this patent is extended or adjusted under 35 U.S.C. 154(b) by 216 days.

(21) Appl. No.: 13/875,206

(22) Filed: May 1, 2013

(65) Prior Publication Data

US 2013/0297169 A1 Nov. 7, 2013

(30) Foreign Application Priority Data

May 1, 2012 (JP) ................................. 2012-104985

(51) Int. Cl.
| | |
|---|---|
| *B60T 8/32* | (2006.01) |
| *G06F 17/00* | (2006.01) |
| *B60W 50/00* | (2006.01) |
| *B60W 50/06* | (2006.01) |
| *B60W 50/10* | (2012.01) |
| *B60W 10/06* | (2006.01) |
| *B60W 10/184* | (2012.01) |
| *B60W 30/14* | (2006.01) |

(52) U.S. Cl.
CPC ........... *G06F 17/00* (2013.01); *B60W 50/0097* (2013.01); *B60W 50/06* (2013.01); *B60W 50/10* (2013.01); *B60W 10/06* (2013.01); *B60W 10/184* (2013.01); *B60W 30/143* (2013.01); *B60W 2540/10* (2013.01); *B60W 2540/12* (2013.01); *Y02T 10/84* (2013.01)

(58) Field of Classification Search
CPC .... G06F 17/00; Y02T 10/84; B60W 50/0097; B60W 50/06; B60W 50/10; B60W 10/06; B60W 10/184; B60W 30/143; B60W 2540/10; B60W 2540/12
See application file for complete search history.

(56) References Cited

U.S. PATENT DOCUMENTS

| | | | | |
|---|---|---|---|---|
| 5,625,558 | A * | 4/1997 | Togai et al. ..................... | 701/93 |
| 6,157,884 | A * | 12/2000 | Narita et al. ..................... | 701/51 |
| 6,265,990 | B1 * | 7/2001 | Isogai et al. .................. | 340/903 |
| 2005/0234629 | A1 * | 10/2005 | Maruki .......................... | 701/93 |

FOREIGN PATENT DOCUMENTS

JP 03233339 A 10/1991

* cited by examiner

*Primary Examiner* — Mary Cheung
(74) *Attorney, Agent, or Firm* — Alleman Hall McCoy Russell & Tuttle LLP

(57) ABSTRACT

In the case where a first condition that a first future demand acceleration which is a demand acceleration when a predetermined first time has elapsed from the present time is lower than a value obtained by subtracting a first allowable value from the accelerator-fully-closed acceleration is satisfied, an accelerator feedback control is stopped while directing an accelerator toward a fully closed position and a brake feedback control is started at the same time to thereby improve followability of an actual vehicle speed to a demand vehicle speed.

10 Claims, 7 Drawing Sheets

First condition: First future demand acceleration < Accelerator-fully-closed acceleration Second condition: Actual vehicle speed > Demand vehicle speed + Second allowable value Switching condition to brake feedback control: first condition and second condition = true Fifth condition: second future demand acceleration > Accelerator-fully-closed acceleration Sixth condition: Actual vehicle speed < Demand vehicle speed - Sixth allowable value Switching condition to accelerator feedback control: fifth condition and sixth condition = true

SPEED CONTROL DEVICE AND PROGRAM FOR SPEED CONTROL DEVICE

TECHNICAL FIELD

The present invention generally relates to a speed control for controlling a speed of, for example, a vehicle on a chassis dynamo and, in particular, to a speed control device and a program therefor for appropriately controlling an accelerator and a brake of a vehicle so as to render an actual vehicle speed of the vehicle to follow a demand vehicle speed.

BACKGROUND ART

For example, in a test mode such as the 10 mode, LA-4 mode, EC mode and the like, which are respectively used in Japan, the United States, and Europe, one or more running patterns is determined for measuring fuel consumption, and there has been known a speed control device for controlling an accelerator and a brake of a vehicle (in particular, an automobile) so that an actual vehicle speed may follow a demand vehicle speed indicated in the running pattern of a test mode.

In such a conventional speed control device, an accelerator pedal and/or a brake pedal of a vehicle disposed on a chassis dynamo is operated by an amount according to a deviation between an actual vehicle speed and a demand vehicle speed so as to render the actual vehicle speed to follow the demand vehicle speed. However, in this speed control device, since a feedback control of the accelerator or the brake is selectively performed almost like a person, it is necessary to determine switching timing of the controls.

Therefore, conventionally, for example, timing of switching from a vehicle speed feedback control by operating an accelerator to a vehicle speed feedback control by operating a brake is set to a time point when the actual vehicle speed is higher than the demand vehicle speed and the vehicle is in a situation that the actual vehicle speed has to be decelerated and when an accelerator opening degree becomes 0 (i.e., accelerator is in a fully closed position), and it is configured that the vehicle speed feedback control is switched to the vehicle speed feedback control by operating the brake at this time point.

Meanwhile, the timing of switching from a vehicle speed feedback control by operating a brake to a vehicle speed feedback control by operating an accelerator is also similar, although reverse, to the above case. That is, the switching timing thereof is set to a time point when the actual vehicle speed is lower than the demand vehicle speed and the vehicle is in a situation that the actual vehicle speed has to be accelerated and when a brake depressing degree becomes 0 (i.e., brake is in an effective beginning position), and it is configured that the vehicle speed feedback control is switched to the vehicle speed feedback control by operating the accelerator at this time point.

In addition, as disclosed in Patent Literature 1, there is a known configuration of determining which of an accelerator or a brake should be controlled by comparing a demand horsepower and an actual horsepower.

CITATION LIST

Patent Literature

Patent Literature 1: JP Heisei 3-233339 A

SUMMARY OF INVENTION

Technical Problem

However, in the conventional vehicle speed control, since the control is switched based on only a situation at the present time, that is, based on only an accelerator opening degree or brake depressing degree, a vehicle speed and the like at the present time, when a demand speed is suddenly changed, there may arise a problem that the actual vehicle speed becomes unable to fully follow the demand vehicle speed.

For example, in the case where an accelerator or a brake is returned to one of the fully closed position or the brake-effective beginning position by the feedback control as described above, it takes a significant amount of time, and in the conventional method of switching to the other control thereafter, in the case where the demand speed is largely changed such as a sudden deceleration, the switching of the control is delayed so that the actual vehicle speed may not fully follow the demand vehicle speed in some cases.

Therefore, the present invention has been made to solve such problems and its essential object is to more accurately set a switching timing between a brake feedback control and an accelerator feedback control in a speed control device of a vehicle so as to further improve followability of an actual vehicle speed to a demand vehicle speed.

Solution to Problem

Accordingly, a speed control device according to the present invention includes: an actual vehicle speed acquisition part for acquiring an actual vehicle speed of a vehicle; a demand vehicle speed acquisition part for acquiring a demand vehicle speed of the vehicle; and a vehicle speed control part selectively performing any one of an accelerator feedback control controlling the actual vehicle speed by driving an accelerator in accordance with a deviation between the actual vehicle speed and the demand vehicle speed or a brake feedback control controlling the actual vehicle speed by driving a brake in accordance with the deviation in order that the actual vehicle speed is allowed to follow the demand vehicle speed, wherein the speed control device further includes: an accelerator-fully-closed acceleration acquisition part for acquiring an accelerator-fully-closed acceleration which is acceleration of the vehicle in a state that the accelerator is fully closed; and a demand acceleration acquisition part for acquiring a demand acceleration of the vehicle, whereby in the case where a first condition that a first future demand acceleration which is a demand acceleration when a predetermined first time has elapsed from the present time is lower than a value obtained by subtracting a first allowable value from the accelerator-fully-closed acceleration is satisfied, the vehicle speed control part stops the accelerator feedback control and directs the accelerator toward a fully closed position and starts the brake feedback control at the same time.

With this configuration, since switching from the accelerator feedback control to the brake feedback control is performed at the present time based on situations of the demand acceleration and the accelerator-fully-closed acceleration in the future after the first time has elapsed from the present time, the switching is performed without causing a delay, and this produces the result that the followability of the actual vehicle speed to the demand vehicle speed can be remarkably improved.

In order to assure a more reliable determination of the switching, it is desirable that the situations at the present time are also included in the control switching condition.

Specifically, it is desirable that, in the case where a second condition that the actual vehicle speed at the present time is higher than a value obtained by adding a predetermined second allowable value to the demand vehicle speed is satisfied in addition to the first condition, the accelerator feedback control is stopped and the accelerator is directed toward the fully closed position to start the brake feedback control at the same time.

Even in the case where there is an unexpected discrepancy in determination in the first condition, in order to supplement the discrepancy by a different pre-read control to thereby prevent occurrence of a large deviation in vehicle speed, it is desirable to have a configuration that, a first expected actual vehicle speed which is an actual vehicle speed when a predetermined second time has elapsed is calculated while maintaining the actual acceleration at the present time, and in the meantime, in the case where the first condition or a third condition that the first expected actual vehicle speed is higher than a value obtained by adding a predetermined third allowable value to a first future demand vehicle speed which is a demand vehicle speed at a time when a second time has elapsed from the present time is satisfied, the accelerator feedback control is stopped and the accelerator is directed toward the fully closed position to start the brake feedback control at the same time.

Further, it is configured that, in the case where a fourth condition that the actual vehicle speed at the present time is higher than a value obtained by adding a predetermined fourth allowable value to the demand vehicle speed is satisfied in addition to the third condition, the accelerator feedback control is stopped and the accelerator is directed toward the fully closed position to start the brake feedback control, whereby a switching timing can be more accurately determined.

In order to appropriately switch from the brake feedback control to the accelerator feedback control, it is desirable that, in the case where a fifth condition that a second future demand acceleration which is a demand acceleration when a predetermined third time has elapsed from the present time is higher than a value obtained by adding a predetermined fifth allowable value to the accelerator-fully-closed acceleration is satisfied, the brake feedback control is stopped and the brake is directed toward an effective beginning position to start the accelerator feedback control at the same time.

At this time, it is preferable that, in the case where a sixth condition that the actual vehicle speed at the present time is lower than a value obtained by subtracting a predetermined sixth allowable value from the demand vehicle speed is satisfied in addition to the fifth condition, the brake feedback control is stopped and the brake is directed toward the effective beginning position to start the accelerator feedback control at the same time.

Even in the case where there is an unexpected discrepancy in determination in the fifth condition, in order to supplement the discrepancy by a different pre-read control to thereby prevent occurrence of a large deviation in vehicle speed, it is desirable to have a configuration that, a second expected actual vehicle speed which is an actual vehicle speed when a predetermined fourth time has elapsed is calculated while maintaining the actual acceleration at the present time. Meanwhile, in the case where the fifth condition or a seventh condition that the second expected actual vehicle speed is lower than a value obtained by subtracting a predetermined seventh allowable value from a second future demand vehicle speed which is a demand vehicle speed after a fourth time has elapsed from the present time is satisfied, the brake feedback control is stopped and the brake is directed toward the effective beginning position to start the accelerator feedback control at the same time.

Moreover, it is further desirable to have a configuration that, in the case where an eighth condition that the actual vehicle speed at the present time is lower than a value obtained by subtracting a predetermined eighth allowable value from the demand vehicle speed is satisfied in addition to the seventh condition, the brake feedback control is stopped and the brake is directed toward the effective beginning position to start the accelerator feedback control at the same time.

Advantageous Effects of Invention

According to the present invention configured as described above, a situation after a predetermined elapsed time is expected from vehicle speed related information at the present time to perform a pre-read control to switch between the accelerator feedback control and the brake feedback control at the present time based on the expectation after the predetermined elapsed time, and therefore the followability or quick reaction capability of an actual vehicle speed to a demand vehicle speed can be remarkably improved.

DESCRIPTION OF EMBODIMENTS

The following describes an embodiment of the present invention referring to the accompanying drawings.

Figure 1:
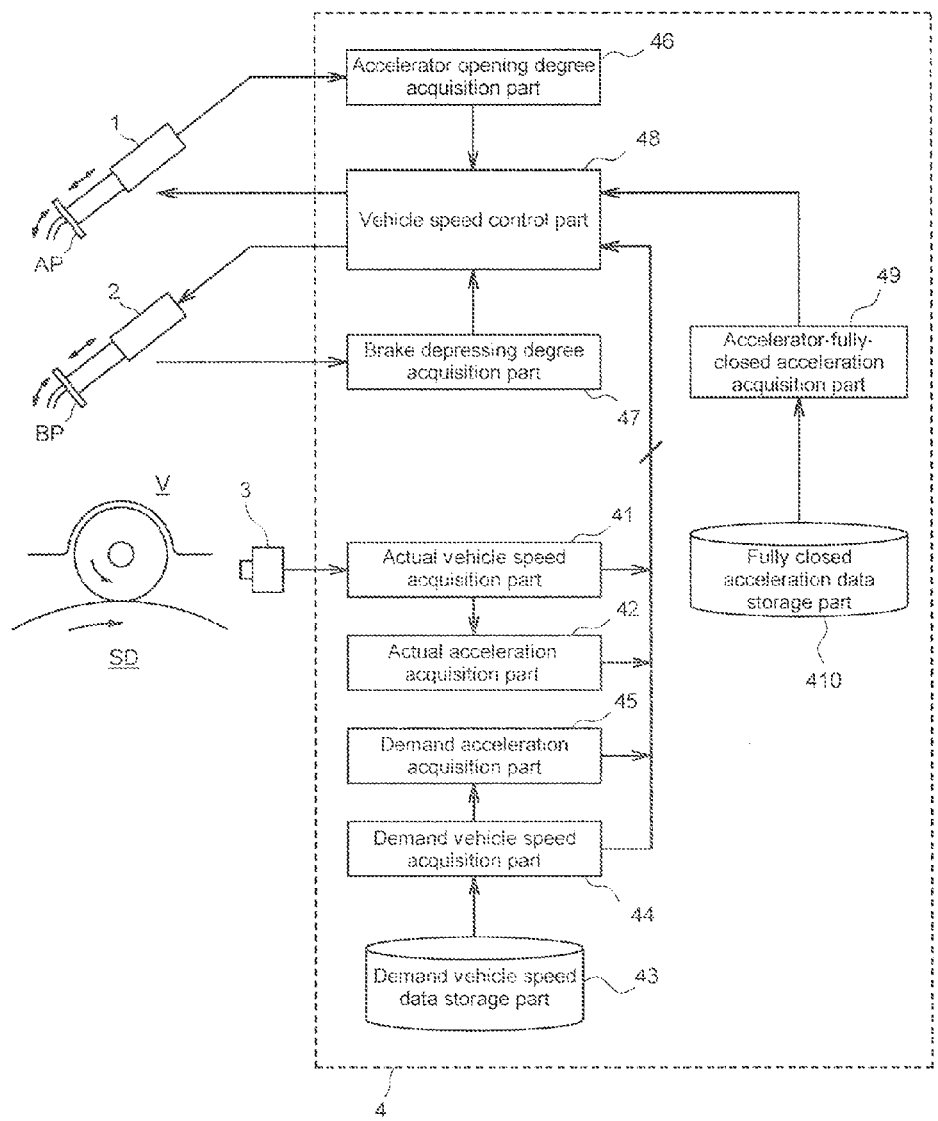
FIG. 1 is a functional block diagram of a speed control device in one embodiment of the present invention.

A speed control device according to the present embodiment is adapted to control a speed of an automobile, that is, a vehicle disposed on a chassis dynamo SD. As shown in FIG. 1, the speed control device includes an accelerator drive mechanism 1 for driving an accelerator and a brake drive mechanism 2 for driving a brake which are arranged in a driver's seat of an automobile and further includes a control main body 4 which outputs a control signal to be applied to the accelerator drive mechanism 1 and the brake drive mechanism 2 to thereby control an accelerator opening degree and a brake depressing degree.

Each of the parts will now be described. As a brief explanation, each of the accelerator drive mechanism 1 and the brake drive mechanism 2 is provided with a cylinder member and a tip end portion thereof is allowed to be advanced and retreated by expanding and contracting the cylinder member. Then, the tip end portion is rendered to abut to an accelerator pedal AP and a brake pedal BP and it is configured that the accelerator and brake are driven by advancing and retreating the tip end portion.

In addition, each of the accelerator drive mechanism 1 and the brake drive mechanism 2 is provided with a position detecting part (such as, e.g., a rotary encoder, not shown) for detecting an advance/retreat position of the tip end portion, and it is configured such that the accelerator opening degree and the brake depressing degree can be confirmed based on a position signal outputted from the position detecting part.

For example, the control main body 4 is composed of, although not shown, a CPU, a memory, an A/D converter, a D/A converter, a communication interface and the like, and the CPU and peripheral equipment thereof are cooperatively operated according to a predetermined program stored in the memory to thereby perform functions as an actual vehicle speed acquisition part 41, an actual acceleration acquisition part 42, a demand vehicle speed data storage part 43, a demand vehicle speed acquisition part 44. a demand acceleration acquisition part 45, an accelerator opening degree acquisition part 46, a brake depressing degree acquisition part 47, an accelerator-fully-closed acceleration acquisition part 49, a vehicle speed control part 48, and the like. Thus, the term "part" used in reference to the aforementioned parts 41-48 refers to software instructions, executed via hardware, which perform the functions described herein. Software instructions may be stored in a non-transitory manner on a computer readable medium (such as nonvolatile portions of the memory described above, a CD-ROM, DVD, FLASH memory, etc.), which upon execution by a processor (such as the CPU described above, an ASIC, controller, or other processor hardware), cause the processor to execute the program and its constituent parts described above.

The actual vehicle speed acquisition part 41 is adapted to receive a vehicle speed signal from a vehicle speed sensor 3 mounted to, e.g., the chassis dynamo SD or an automobile, and convert the received value thereof to an actual vehicle speed.

The actual acceleration acquisition part 42 is adapted to calculate an actual acceleration based on a variation with time lapse of the vehicle speed acquired by the actual vehicle speed acquisition part 41. Note that the actual acceleration may be acquired by receiving a signal from an acceleration sensor separately provided.

The demand vehicle speed data storage part 43 is preset in a predetermined area of the memory to store data with time lapse of a demand vehicle speed, i.e., demand vehicle speed data indicative of a demand vehicle speed every time.

The demand vehicle speed acquisition part 44 is adapted to access the demand vehicle speed data storage part 43 and acquire a demand vehicle speed at any specified time (present time, past. and future).

The demand acceleration acquisition part 45 is adapted to access the demand vehicle speed data storage part 43 and calculate a demand acceleration at any specified time (present time, past and future) from a variation in time of a demand vehicle speed at that time.

The accelerator opening degree acquisition part 46 is adapted to receive a position signal outputted from the accelerator drive mechanism 1 and convert a value of the received position signal to an accelerator opening degree. Note that "accelerator fully closed" is synonymous with "accelerator opening degree 0," hereinafter.

The brake depressing degree acquisition part 47 is adapted to receive a position signal outputted from the brake drive mechanism 2 and convert a value of the received position signal to a brake depressing degree. Note that "brake-effective beginning position" is synonymous with "brake depressing degree 0," hereinafter.

The accelerator-fully-closed acceleration acquisition part 49 is adapted to acquire an accelerator-fully-closed acceleration that is acceleration of a vehicle when the accelerator is fully closed and the brake depressing degree is 0. This acceleration corresponds to a deceleration when a so-called engine brake is acting. In specific, this accelerator-fully-closed acceleration is stored in an accelerator-fully-closed acceleration storage part 410 defined in a predetermined area of the memory, and a value calculated from such as performance data, etc., of the vehicle is set to a first default value thereof. In the present embodiment, the accelerator-fully-closed acceleration stored in the accelerator-fully-closed acceleration storage part 410 is set so as to be sequentially updated by a value obtained by learning from an actual acceleration obtained by the actual acceleration acquisition part 42 through a running test, etc.

It is noted that the accelerator-fully-closed acceleration is not a single value but a plurality of values which may be defined using parameters such as, e.g., a gear ratio and an engine rotation. In that case, the accelerator-fully-closed acceleration acquisition part 49 may be adapted to learn and specify the accelerator-fully-closed acceleration from the values of the parameters.

The vehicle speed control part 48 has at least a function of selectively performing any one of an accelerator feedback control in which the accelerator is driven in accordance with a deviation between the actual vehicle speed and a demand vehicle speed so as to control the actual vehicle speed and a brake feedback control in which the brake is driven in accordance with the deviation so as to control the actual vehicle speed, in order to render the actual vehicle speed to follow the demand vehicle speed.

Next, the following describes an operation of the present speed control device mentioned above together with a detailed description of each of the parts.

First, an operation starting from a state of performing a speed feedback control, i.e., an accelerator feedback control by an accelerator control part 481 in Step S11 and subsequent operations will be described referring to the flowchart shown in FIG. 2.

First, an actual vehicle speed and a demand vehicle speed at the present time are acquired by the actual vehicle speed acquisition part 41 and the actual acceleration acquisition part 42, respectively, in Step S12.

Further, a first future demand acceleration which is a demand acceleration when a predetermined first time (herein, 0.1 second) has elapsed from the present time and the accelerator-fully-closed acceleration are acquired by the demand acceleration acquisition part 45 and the accelerator-fully-closed acceleration acquisition part 49, respectively, in Step S13.

Subsequently, the vehicle speed control part 48 compares the first future demand acceleration and the fully closed acceleration and determines whether or not a first condition that the first future demand acceleration is lower than a value obtained by subtracting a predetermined first allowable value (herein, e.g., 0) from the fully closed acceleration is satisfied in Step S14.

Moreover, in addition to the first condition, the vehicle speed control part 48 determines whether or not a second condition that the actual vehicle speed at the present time is higher than a value obtained by adding a predetermined second allowable value (herein, e.g., 0.2 km/h) to the demand vehicle speed is satisfied in Step S15.

Then, in the case where the first and second conditions are both satisfied, the vehicle speed control part 48 stops the accelerator feedback control and instructs the accelerator drive mechanism 1 to return the accelerator opening degree to the fully closed position at the highest drive speed and starts the brake feedback control in Step S16.

Meanwhile, in the case where either the first condition or the second condition is not satisfied, the accelerator feedback control is continued as it is in Step S11.

Figure 2:
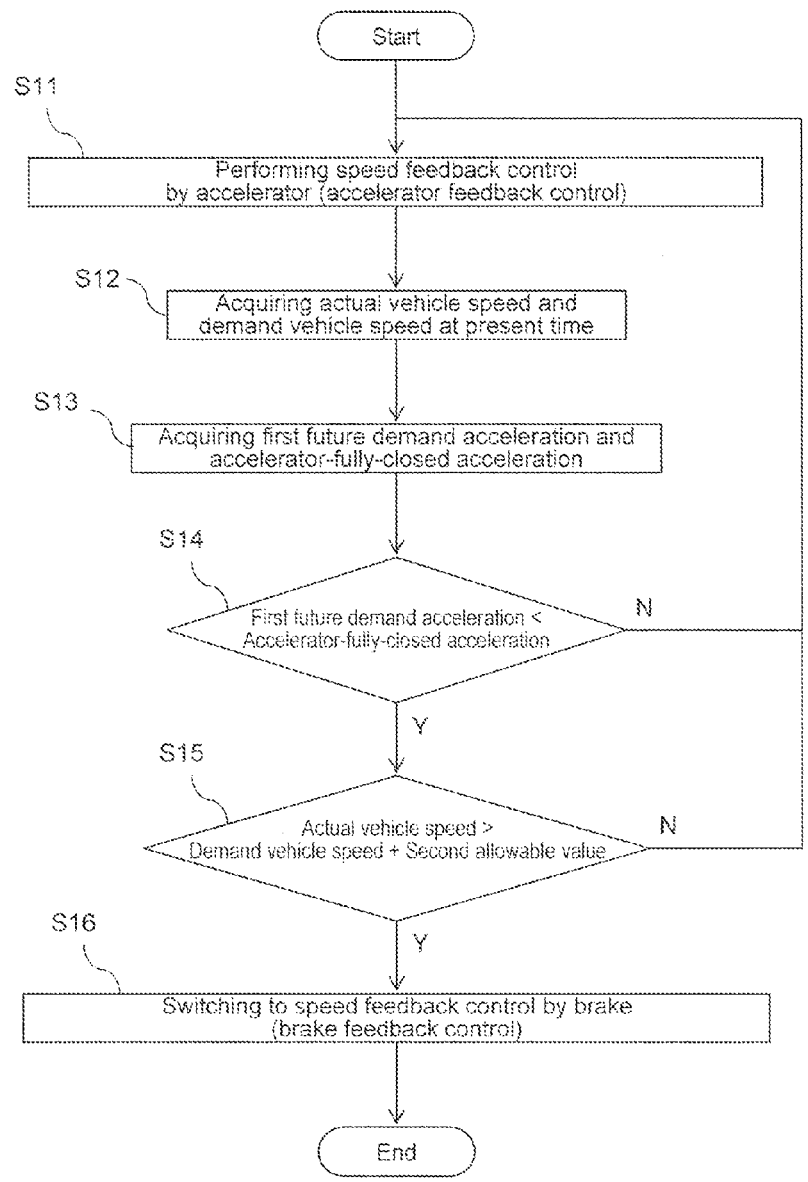
FIG. 2 is a flowchart showing an operation at a time of changing from an acceleration feedback control to a brake feedback control in the same embodiment.
Figure 4:
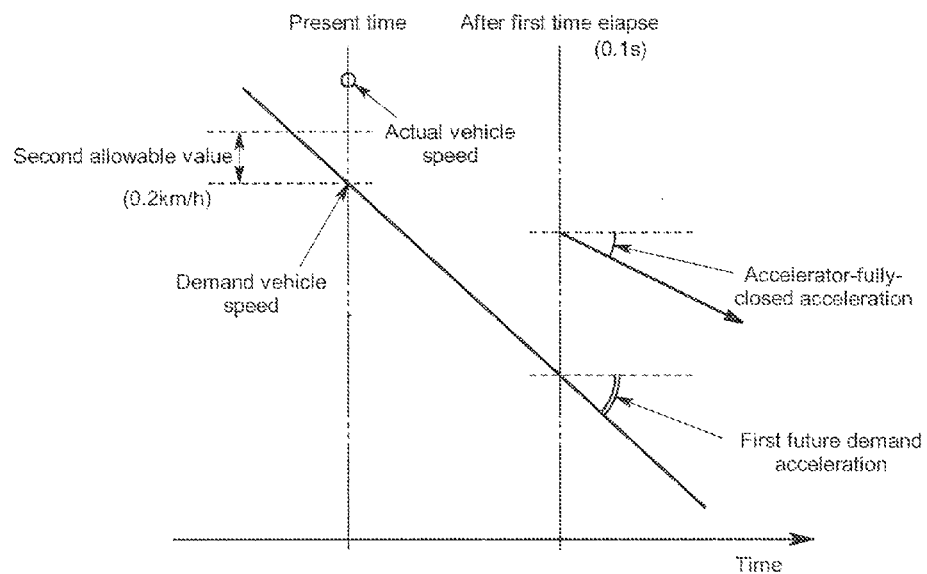
FIG. 4 is a timing chart for explaining first and second conditions at a time of changing from an acceleration feedback control to a brake feedback control in the same embodiment.

In this operation, FIG. 4 is a timing chart showing an outline of the control shown in FIG. 2.

Subsequently, an operation starting from a state of performing a speed feedback control, i.e., a brake feedback control by a brake control part 482 in Step S21 and subsequent operations will be described referring to the flowchart shown in FIG. 3.

First, an actual vehicle speed and a demand vehicle speed at the present time are acquired by the actual vehicle speed acquisition part 41 and the actual acceleration acquisition part 42, respectively, in Step S22.

Further, a second future demand acceleration which is a demand acceleration when a predetermined third time (herein, 0.1 second) has elapsed from the present time and the accelerator-fully-closed acceleration are acquired by the demand acceleration acquisition part 45 and the accelerator-fully-closed acceleration acquisition part 49, respectively, in Step S23.

Subsequently, the vehicle speed control part 48 compares the second future demand acceleration and the fully closed acceleration and determines whether or not a fifth condition that the second future demand acceleration is higher than a value obtained by adding a predetermined fifth allowable value (herein, e.g., 0) to the fully closed acceleration is satisfied in Step S24.

Moreover, in addition to the fifth condition, the vehicle speed control part 48 determines whether or not a sixth condition that the actual vehicle speed at the present time is lower than a value obtained by subtracting a predetermined sixth allowable value (herein, e.g., 0.2 km/h) from the demand vehicle speed is satisfied in Step S25.

Then, in the case where the fifth and sixth conditions are both satisfied, the vehicle speed control part 48 stops the brake feedback control and instructs the brake drive mechanism 2 to return the brake position to the effective beginning position at the highest drive speed and starts the accelerator feedback control in Step S26.

Meanwhile, in the case where either the fifth condition or the sixth condition is not satisfied, the brake feedback control is continued as it is in Step S27.

Figure 3:
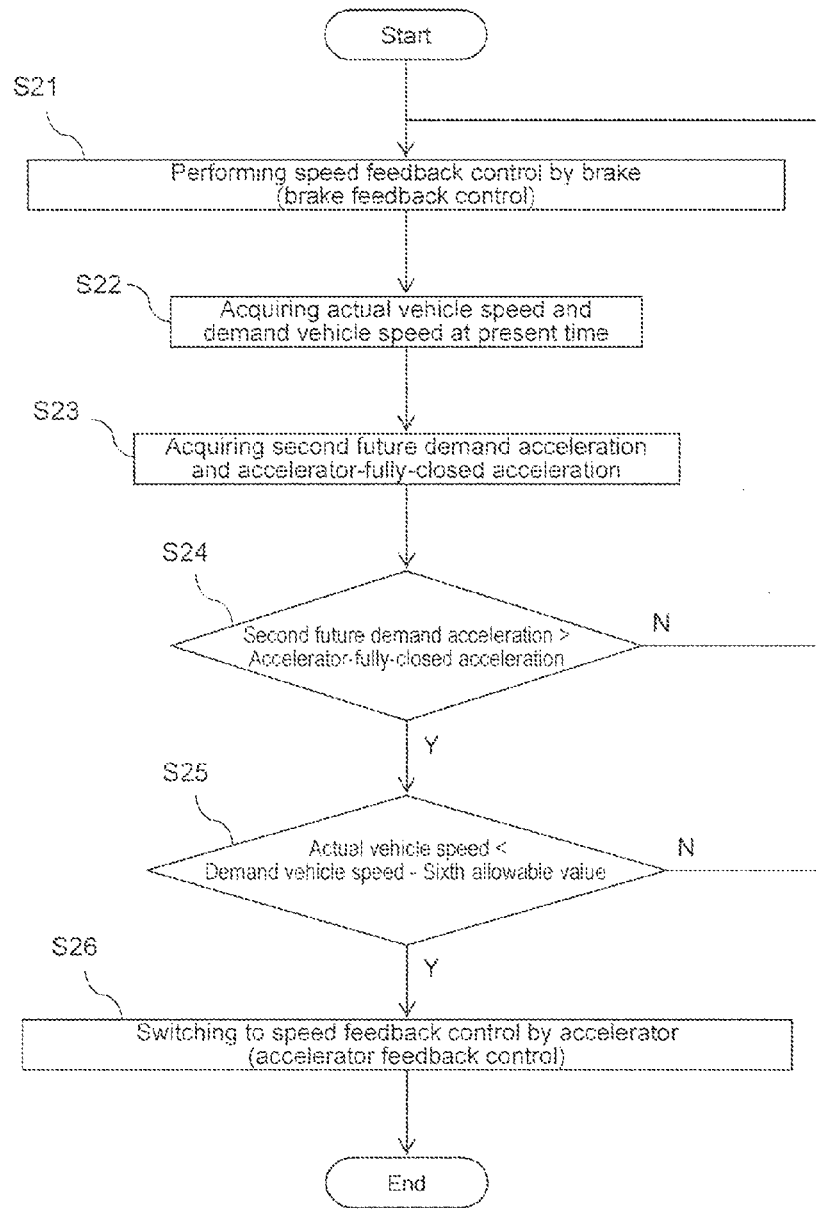
FIG. 3 is a flowchart showing an operation at a time of changing from a brake feedback control to an acceleration feedback control in the same embodiment.
Figure 5:
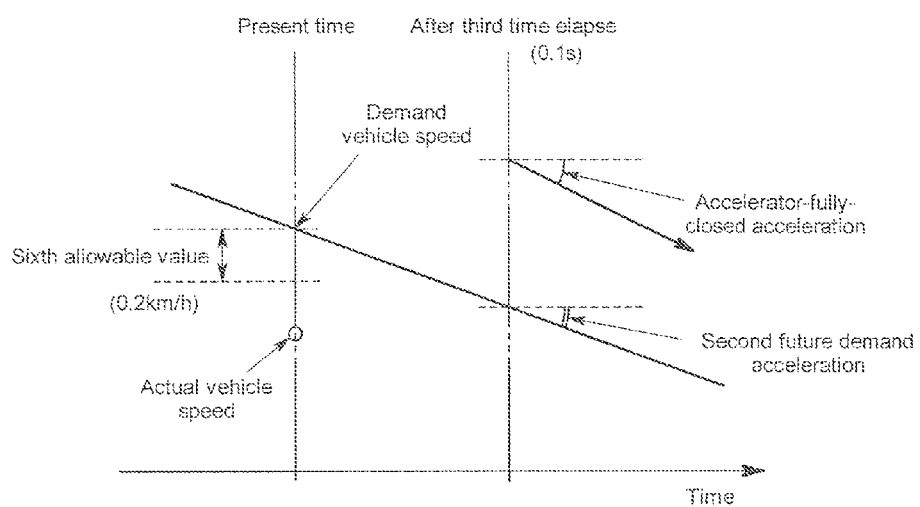
FIG. 5 is a timing chart for explaining fifth and sixth conditions at a time of changing from a brake feedback control to an acceleration feedback control in the same embodiment.

In this operation, FIG. 5 is a timing chart showing an outline of the control shown in FIG. 3.

With this configuration, since a switching between the accelerator feedback control and the brake feedback control is performed at the present time in accordance with situations of the demand acceleration and the accelerator-fully-closed acceleration in the future after the predetermined time has elapsed from the present time, the switching is performed without causing a delay, and this results in that the followability of the actual vehicle speed to the demand vehicle speed can be remarkably improved.

It is noted that, in the case switching from the accelerator feedback control to the brake feedback control, with use of a third condition and a fourth condition as to be described later together with the first and second conditions for determination of the switching, these third and fourth conditions can supplement in such a case where a learning value of the accelerator-fully-closed acceleration is improper.

In specific, the third condition is a condition that a first expected actual vehicle speed after a predetermined second time has elapsed from the present time is higher than a value obtained by adding a predetermined third allowable value to the first future demand vehicle speed which is a demand speed after the same second time has elapsed from the present time.

It is noted that the first expected actual vehicle speed is calculated from the actual vehicle speed at the present time on the premise that the actual acceleration is maintained as it is by the vehicle speed control part 48. Herein, the second time is set to be larger than the first time, for example, 1 second. Also, the first future demand vehicle speed is acquired by the demand vehicle speed acquisition part 44.

The fourth condition is a condition that the actual vehicle speed at the present time is higher than a value obtained by adding a predetermined fourth allowable value to the demand vehicle speed.

Then, in the case where a following conditional expression T1 is true, the vehicle speed control part 48 stops the accelerator feedback control, instructs the accelerator drive mechanism 1 to return the accelerator opening degree to the fully closed position at a maximum drive speed, and starts the brake feedback control at the same time.

$$T1 = (\text{Condition 1 and Condition 2}) \text{ or } (\text{Condition 3 and Condition 4})$$

Figure 6:
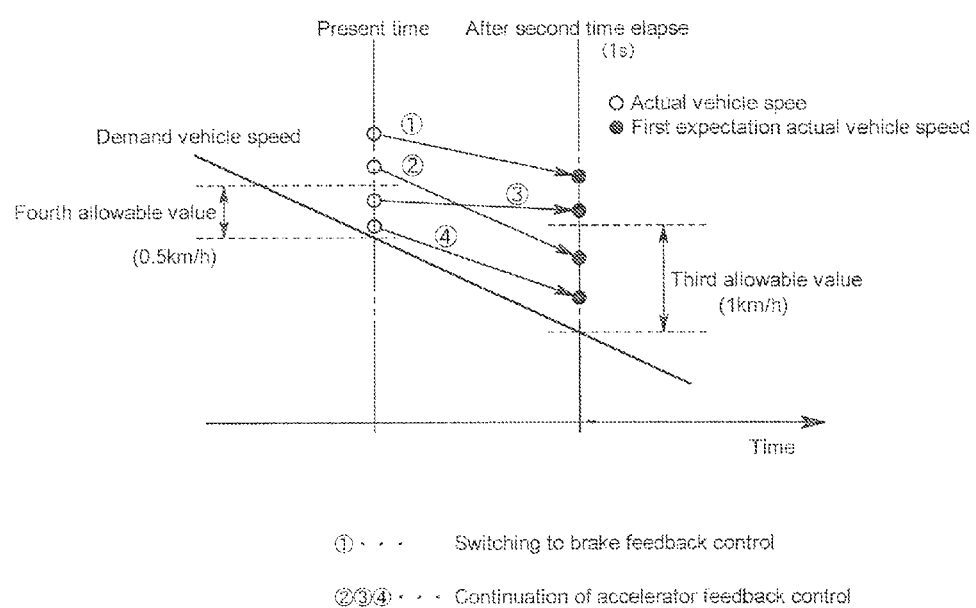
FIG. 6 is a timing chart for explaining third and fourth conditions at a time of changing from an acceleration feedback control to a brake feedback control in the same embodiment.

In addition, FIG. 6 shows a timing chart for explaining the above term (Condition 3 and Condition 4).

Similarly to the case of switching from the brake feedback control to the accelerator feedback control, it is preferable to use also seventh and eighth conditions together with the fifth and sixth conditions for determining the switching.

In specific, the seventh condition is a condition that a second expected actual vehicle speed after a predetermined fourth time has elapsed from the present time is lower than a value obtained by subtracting a predetermined seventh allowable value from the second future demand vehicle speed which is a demand speed after the predetermined fourth time has elapsed from the present time. It is noted that the second expected actual vehicle speed is calculated from the actual vehicle speed at the present time on the premise that the actual acceleration is maintained as it is by the vehicle speed control part 48. Herein, the fourth time is set to be larger than the third time, for example, to 1 second. Also, the second future demand vehicle speed is acquired by the demand vehicle speed acquisition part 44.

The eighth condition is a condition that the actual vehicle speed at the present time is lower than a value obtained by subtracting a predetermined eighth allowable value from the demand vehicle speed.

Then, in the case where a following conditional expression T2 is true, the vehicle speed control part 48 stops the accelerator feedback control, instructs the accelerator drive mechanism 1 to return the accelerator opening degree to the fully closed position at a maximum drive speed, and starts the brake feedback control at the same time.

$$T2 = (\text{Condition 5 and Condition 6}) \text{ or } (\text{Condition 7 and Condition 8})$$

Figure 7:
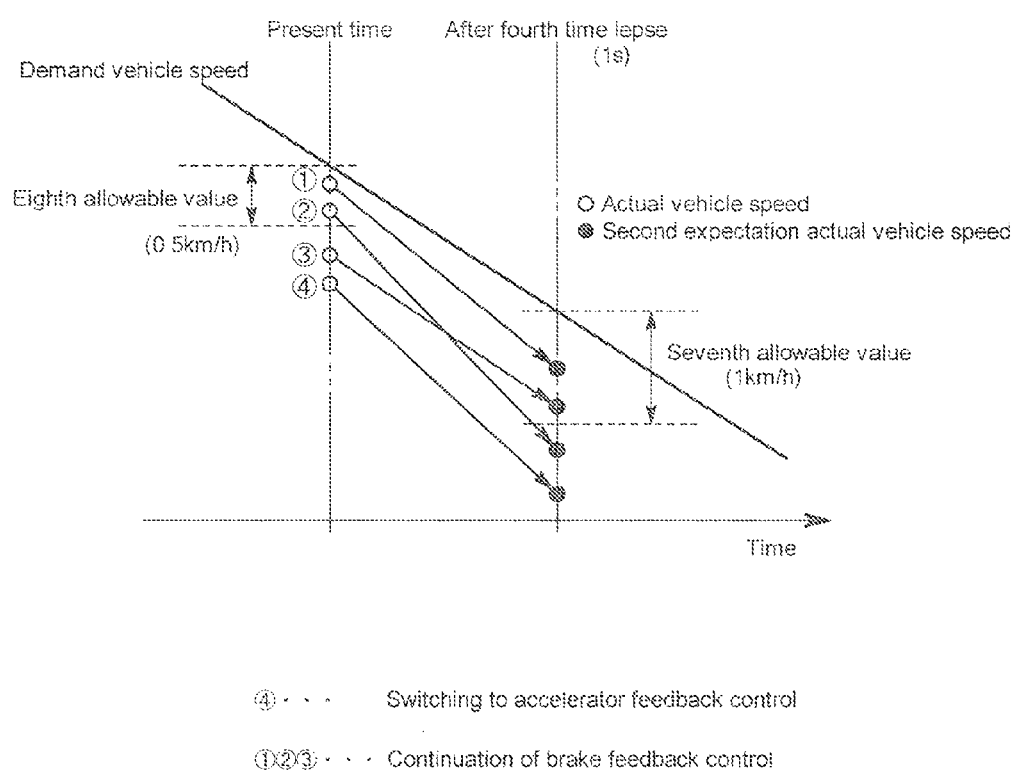
FIG. 7 is a timing chart for explaining seventh and eighth conditions at a time of changing from a brake feedback control to an acceleration feedback control in the same embodiment.

In addition, FIG. 7 shows a timing chart for explaining the above term (Condition 7 and Condition 8).

It is noted that the present invention is not limited to the above embodiment. For example, the present embodiment may be used only in the case of switching from the accelerator feedback control to the brake feedback control while the conventional speed control is performed in the reverse case. Alternatively, the present embodiment may be used only in the case of switching from the brake feedback control to the accelerator feedback control while the conventional speed control is performed in the reverse case.

Furthermore, the conditions 2 to 4 and 6 to 8 are not necessarily required and only a part thereof may be used, and further another condition may be added.

In addition, even when the above conditions are satisfied, in the case where the accelerator opening degree becomes 0 when performing the accelerator feedback control or in the case where the brake depressing degree becomes 0 when performing the brake feedback control, the control may be switched at that time as in the conventional method.

In addition, the present invention should not be limited the present embodiment, and various modifications are of course possible within the scope unless departing from the intended spirit thereof.

REFERENCE CHARACTERS LIST

41 . . . Actual vehicle speed acquisition part
42 . . . Actual acceleration acquisition part
43 . . . Demand vehicle speed data storage part
44 . . . Demand vehicle speed acquisition part
45 . . . Demand acceleration acquisition part
46 . . . Accelerator opening degree acquisition part
47 . . . Brake depressing degree acquisition part
48 . . . Vehicle speed control part

The invention claimed is:

1. A speed control device comprising:
an actual vehicle speed acquisition part for acquiring an actual vehicle speed of a vehicle;
a demand vehicle speed acquisition part for acquiring a demand vehicle speed of the vehicle; and
a vehicle speed control part selectively performing any one of an accelerator feedback control controlling the actual vehicle speed by driving an accelerator in accordance with a deviation between the actual vehicle speed and the demand vehicle speed or a brake feedback control controlling the actual vehicle speed by driving a brake in accordance with the deviation in order that the actual vehicle speed is allowed to follow the demand vehicle speed, wherein
the speed control device further comprises:
an accelerator-fully-closed acceleration acquisition part for acquiring an accelerator-fully-closed acceleration which is acceleration of the vehicle in a state that the accelerator is fully closed; and
a demand acceleration acquisition part for acquiring a demand acceleration of the vehicle, whereby
in the case where a first condition that a first future demand acceleration which is a demand acceleration when a predetermined first time has elapsed from the present time is lower than a value obtained by subtracting a first allowable value from the accelerator-fully-closed acceleration is satisfied, the vehicle speed control part stops the accelerator feedback control, directs the accelerator toward a fully closed position and starts the brake feedback control.

2. The speed control device according to claim 1, wherein in the case where a second condition that the actual vehicle speed at the present time is higher than a value obtained by adding a predetermined second allowable value to the demand vehicle speed is satisfied in addition to the first condition, the vehicle speed control part stops the accelerator feedback control, directs the accelerator toward the fully closed position and starts the brake feedback control.

3. The speed control device according to claim 1, wherein the vehicle speed control part calculates a first expected actual vehicle speed which is an actual vehicle speed when a predetermined second time has elapsed while maintaining an actual acceleration at the present time, and in the meantime,
in the case where the first condition or a third condition that the first expected actual vehicle speed is higher than a value obtained by adding a predetermined third allowable value to a first future demand vehicle speed which is a demand vehicle speed at a time when a predetermined second time has elapsed from the present time is satisfied, the vehicle speed control part stops the accelerator feedback control, directs the accelerator toward the fully closed position and starts the brake feedback control.

4. The speed control device according to claim 3, wherein in the case where a fourth condition that the actual vehicle speed at the present time is higher than a value obtained by adding a predetermined fourth allowable value to the demand vehicle speed is satisfied in addition to the third condition, the vehicle speed control part stops the accelerator feedback control, directs the accelerator toward the fully closed position and starts the brake feedback control.

5. A computer readable medium having non-transitory software instructions stored thereon, which upon execution by a processor, cause the processor to execute:
an actual vehicle speed acquisition part for acquiring an actual vehicle speed of a vehicle;
a demand vehicle speed acquisition part for acquiring a demand vehicle speed of the vehicle;
a vehicle speed control part selectively performing any one of an accelerator feedback control controlling the actual vehicle speed by driving an accelerator in accordance with a deviation between the actual vehicle speed and the demand vehicle speed or a brake feedback control controlling the actual vehicle speed by driving a brake in accordance with the deviation in order that the actual vehicle speed is allowed to follow the demand vehicle speed;
an accelerator-fully-closed acceleration acquisition part for acquiring an accelerator-fully-closed acceleration which is acceleration of the vehicle in a state that the accelerator is fully closed; and
a demand acceleration acquisition part for acquiring a demand acceleration of the vehicle, wherein
in the case where a first condition that a first future demand acceleration which is a demand acceleration when a predetermined first time has elapsed from the present time is lower than a value obtained by subtracting a first allowable value from the accelerator-fully-closed acceleration is satisfied, the software instructions are configured such that, the vehicle speed control part is rendered to perform functions of stopping the accelerator feedback control, directing the accelerator toward a fully closed position and starting the brake feedback control.

6. A speed control device comprising:
an actual vehicle speed acquisition part for acquiring an actual vehicle speed of a vehicle;
a demand vehicle speed acquisition part for acquiring a demand vehicle speed of the vehicle; and a vehicle speed control part selectively performing any one of an accelerator feedback control controlling the actual vehicle speed by driving an accelerator in accordance with a deviation between the actual vehicle speed and the demand vehicle speed or a brake feedback control controlling the actual vehicle speed by driving a brake in accordance with the deviation in order that the actual vehicle speed is allowed to follow the demand vehicle speed, wherein the speed control device further comprises:

an accelerator-fully-closed acceleration acquisition part for acquiring an accelerator-fully-closed acceleration which is acceleration of the vehicle in a state that the accelerator is fully closed; and a demand acceleration acquisition part for acquiring a demand acceleration of the vehicle, whereby in the case where a fifth condition that a second future demand acceleration which is a demand acceleration when a predetermined third time has elapsed from the present time is higher than a value obtained by adding a predetermined fifth allowable value to the accelerator-fully-closed acceleration is satisfied, the vehicle speed control part stops the brake feedback control, directs the brake toward an effective beginning position and starts the accelerator feedback control.

7. The speed control device according to claim 6, wherein in the case where a sixth condition that the actual vehicle speed at the present time is lower than a value obtained by subtracting a predetermined sixth allowable value from the demand vehicle speed is satisfied in addition to the fifth condition, the vehicle speed control part stops the brake feedback control, directs the brake toward the effective beginning position and starts the accelerator feedback control.

8. The speed control device according to claim 6, wherein the vehicle speed control part calculates a second expected actual vehicle speed which is an actual vehicle speed when a predetermined fourth time has elapsed while maintaining an actual acceleration at the present time, in the meantime, in the case where the fifth condition or a seventh condition that the second expected actual vehicle speed is lower than a value obtained by subtracting a predetermined seventh allowable value from a second future demand vehicle speed which is a demand vehicle speed after a predetermined fourth time has elapsed from the present time is satisfied, the vehicle speed control part stops the brake feedback control, directs the brake toward the effective beginning position and starts the accelerator feedback control.

9. The speed control device according to claim 8, wherein in the case where an eighth condition that the actual vehicle speed at the present time is lower than a value obtained by subtracting a predetermined eighth allowable value from the demand vehicle speed is satisfied in addition to the seventh condition, the vehicle speed control part stops the brake feedback control, directs the brake toward the effective beginning position and starts the accelerator feedback control.

10. A computer readable medium having non-transitory software instructions stored thereon, which upon execution by a processor, cause the processor to execute:

an actual vehicle speed acquisition part for acquiring an actual vehicle speed of a vehicle;

a demand vehicle speed acquisition part for acquiring a demand vehicle speed of the vehicle;

a vehicle speed control part selectively performing any one of an accelerator feedback control controlling the actual vehicle speed by driving an accelerator in accordance with a deviation between the actual vehicle speed and the demand vehicle speed or a brake feedback control controlling the actual vehicle speed by driving a brake in accordance with the deviation in order that the actual vehicle speed is allowed to follow the demand vehicle speed;

an accelerator-fully-closed acceleration acquisition part for acquiring an accelerator-fully-closed acceleration which is acceleration of the vehicle in a state that the accelerator is fully closed; and a demand acceleration acquisition part for acquiring a demand acceleration of the vehicle, wherein the software instructions are configured such that, in the case where a fifth condition that a second future demand acceleration which is a demand acceleration when a predetermined third time has elapsed from the present time is higher than a value obtained by adding a predetermined fifth allowable value to the accelerator-fully-closed acceleration is satisfied, the vehicle speed control part is rendered to perform functions of stopping the brake feedback control, directing the brake toward an effective beginning position and starting the accelerator feedback control.

\* \* \* \* \*